United States Patent
Takaiwa

(10) Patent No.: US 8,264,561 B2
(45) Date of Patent: Sep. 11, 2012

(54) IMAGE PICKUP APPARATUS DETACHABLY CONNECTING TO LIGHT EMITTING DEVICE AND CONTROL METHOD THEREOF

(75) Inventor: Kan Takaiwa, Hachioji-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 209 days.

(21) Appl. No.: 12/794,072

(22) Filed: Jun. 4, 2010

(65) Prior Publication Data

US 2010/0309326 A1 Dec. 9, 2010

(30) Foreign Application Priority Data

Jun. 9, 2009 (JP) .................. 2009-138236

(51) Int. Cl.
*H04N 5/225* (2006.01)
*H04N 5/222* (2006.01)
(52) U.S. Cl. .................... 348/220.1; 348/371
(58) Field of Classification Search ............. 348/220.1, 348/370, 371; 396/176–178
See application file for complete search history.

(56) References Cited

U.S. PATENT DOCUMENTS
2004/0174454 A1 * 9/2004 Okamura ............... 348/347

FOREIGN PATENT DOCUMENTS
JP 63-151279 6/1988
JP 02044877 A * 2/1990

OTHER PUBLICATIONS

English Translation by Human Translator of JPA 63-151279 Submitted with Information Disclosure Statement Filed Jun. 4, 2010.

* cited by examiner

*Primary Examiner* — Tuan Ho
*Assistant Examiner* — Shahbaz Nazrul
(74) *Attorney, Agent, or Firm* — Cowan, Liebowitz & Latman, P.C.

(57) ABSTRACT

An image pickup apparatus detachably connecting to a light emitting device. Still image shooting is performed during moving image recording being paused according to a still image shooting instruction received during the moving image recording being performed and the moving image recording is resumed after performing the still image shooting. Information about charge control of the connected light emitting device is acquired. Light emitting of the connected light emitting device involved with the still image shooting is prohibited based on the acquired information about the charge control.

26 Claims, 4 Drawing Sheets

FIG.3

| COMMAND | COMMAND CONTENT (CAMERA → STROBE) | CAMERA TRANSMISSION DATA | STROBE TRANSMISSION DATA |
|---|---|---|---|
| 0x0 | QUERY FOR STROBE TYPE | (N/A) | STROBE TYPE |
| 0x1 | SETTING OF AMOUNT OF LIGHT EMISSION | AMOUNT OF LIGHT EMISSION | AMOUNT OF LIGHT EMISSION WHICH HAS BEEN SET |
| 0x2 | SETTING OF ZOOM POSITION | ZOOM POSITION | ZOOM POSITION WHICH HAS BEEN SET |
| 0x3 | CONTROL OF CHARGING | 0x01 : START CHARGING, 0x02 : STOP CHARGING | STATE OF CHARGING CIRCUIT |
| 0x4 | QUERY FOR STATE OF CHARGE | (N/A) | CHARGING RATE |

IMAGE PICKUP APPARATUS DETACHABLY CONNECTING TO LIGHT EMITTING DEVICE AND CONTROL METHOD THEREOF

BACKGROUND OF THE INVENTION

1. Field of the Invention

The present invention relates to an image pickup apparatus detachably connecting to a light emitting device and a control method thereof.

2. Description of the Related Art

Some conventional image pickup apparatuses are provided with a strobe light emitting device mounted thereon and used for shooting of still images and have a function of resuming recording of a moving image after the moving image recording is paused to shoot a still image using the strobe light emitting device.

In this case, generally, a main capacitor for strobe light emitting internally included in the strobe light emitting device is automatically charged by a built-in charging circuit after a strobe light is emitted. In this case, there is a problem that a sound caused when the charging circuit charges the main capacitor (hereinafter simply referred to as a charging sound) is recorded on a sound recording area of a moving image recording medium.

To solve this problem, a variety of techniques have been proposed in Japanese Laid-Open Patent Publication (Kokai) No. 63-151279 (hereinafter referred to as prior art document 1). A video camera having a still camera described in prior art document 1 prevents a charging sound from being recorded by muting an audio signal during charging of a main capacitor. Further, according to prior art document 1, while the main capacitor is being charged, the amplifier gain of the audio signal is reduced so as to lower the recording level of the audio signal including charging sound.

Further, according to prior art document 1, a signal component having the same frequency as that of an oscillation sound generated during charging is removed. Further, according to prior art document 1, an audio signal previously registered in a memory is recorded together with a moving image during charging.

Furthermore, in recent years, a strobe light emitting device has been proposed in which an oscillation frequency of a charging circuit in the strobe light emitting device is set outside an audible band. In a case where such a kind of strobe light emitting device is mounted on an image pickup apparatus which can shoot a still image as well as recording a moving image, a charging sound of a charging circuit in the strobe light emitting device is not recorded even if the strobe light emitting device is used to shoot a still image during a pause of recording of a moving image and then the moving image recording is resumed.

However, conventional image pickup apparatuses have the following problems. First, if audio signals are muted during charging as described in prior art document 1, the audio signals cannot be recorded until charging of the main capacitor is completed after a still image is shot.

In addition, if the recording level of audio signals is lowered as described in prior art document 1, the sound level of reproduction is unnaturally varied because the recording level of audio signals is low until charging of a main capacitor is completed after a still image is shot.

In addition, a technique for removing a signal component having the same frequency as that of a charging sound as described in prior art document 1 can be used only in a case where the frequency of the charging sound is known, and therefore cannot be applied to a wide variety of strobe light emitting devices.

In addition, in a case where an audio signal previously registered in a memory is recorded together with a moving image during charging as described in prior art document 1, a sound from a photographic subject cannot be recorded during the charging.

Further, if the oscillation frequency of a charging circuit is set outside an audible band, a charging sound is not recorded even in a case where a still image is shot during recording of a moving image and then the moving image recording is continued.

However, in the case of this technique, users who benefit from this technique are limited because the oscillation frequency of the charging circuit of a strobe light emitting device owned by a user is not always set outside an audible band.

SUMMARY OF THE INVENTION

The present invention is made in view of the above described technical background, and is intended to provide an image pickup apparatus and a control method thereof configured to prevent a charging sound generated during charging of a main capacitor for strobe light emitting from being recorded in a case where moving image recording is resumed after the moving image recording is paused to shoot a still image using strobe light emitting.

In a first aspect of this invention, there is provided an image pickup apparatus detachably connecting to a light emitting device and is configured to perform still image shooting during moving image recording being paused according to a still image shooting instruction received during the moving image recording being performed and resume the moving image recording after performing the still image shooting, the image pickup apparatus comprising an acquiring unit adapted to acquire information about charge control of the connected light emitting device, and a light emission control unit adapted to prohibit light emitting of the connected light emitting device involved with the still image shooting, based on the information about the charge control acquired by the acquiring unit.

According to the present invention, a charging sound generated during charging of a main capacitor for strobe light emitting can be prevented from being recorded in a case where recording of a moving image is resumed after the moving image recording is paused to shoot a still image using strobe light emitting.

The above and other objects, features, and advantages of the invention will become more apparent from the following detailed description taken in conjunction with the accompanying drawings.

BRIEF DESCRIPTION OF THE DRAWINGS

FIG. 3 is a diagram showing commands used in communication between the image pickup apparatus and the strobe light emitting device.

DESCRIPTION OF THE EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

Figure 1:
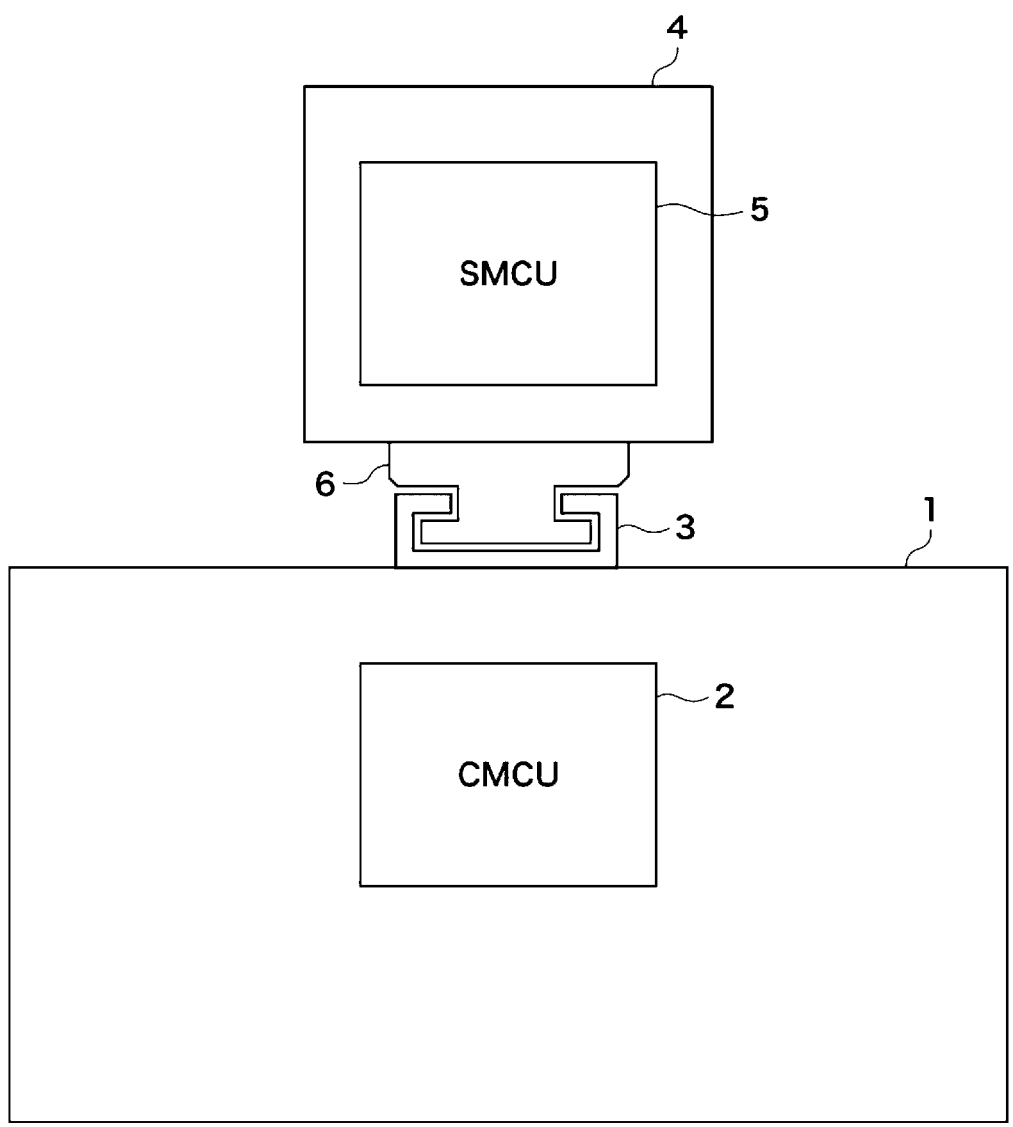
FIG. 1 is a block diagram showing a schematic configuration of an image pickup apparatus according to an embodiment of the present invention.

FIG. 1 is a block diagram showing a schematic configuration of an image pickup apparatus according to an embodiment of the present invention. In FIG. 1, an image pickup apparatus 1 includes a microcontroller (hereinafter referred to as a CMCU) 2 adapted to control operation of the image pickup apparatus 1, and an accessory shoe 3 for mounting various accessories such as a later-described strobe light emitting device 4 on the image pickup apparatus 1.

The strobe light emitting device 4 includes a microcontroller (hereinafter referred to as an SMCU) 5 adapted to control operation of the strobe light emitting device 4, and a leg of the strobe light emitting device (hereinafter referred to as a strobe leg) 6 for mounting the strobe light emitting device 4 on the image pickup apparatus 1 or the like. The strobe light emitting device 4 is mounted on the image pickup apparatus 1 by engaging the strobe leg 6 with the accessory shoe 3.

Figure 2:
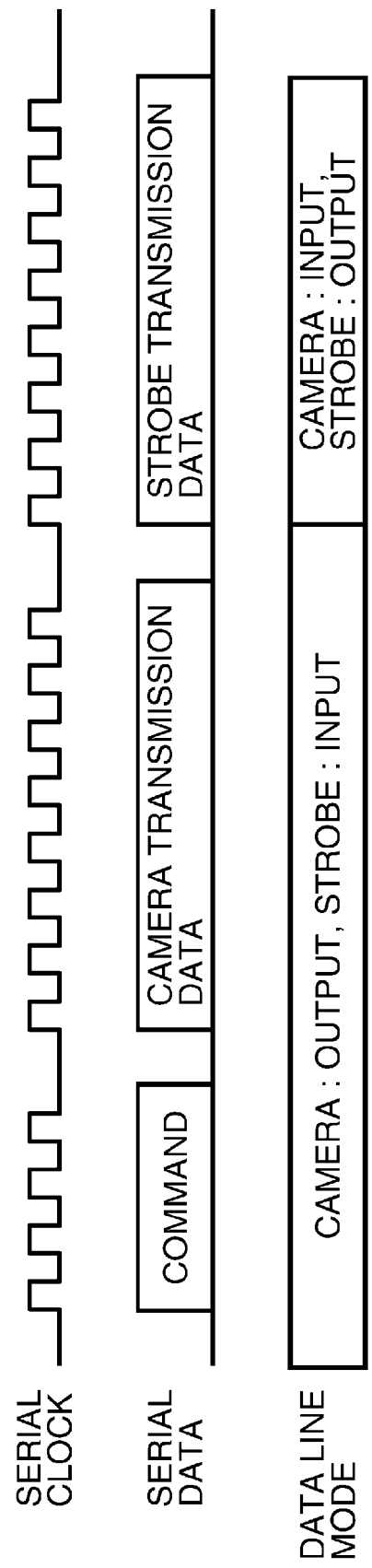
FIG. 2 is a timing chart showing signals communicated between the image pickup apparatus and a strobe light emitting device.
Figure 4:
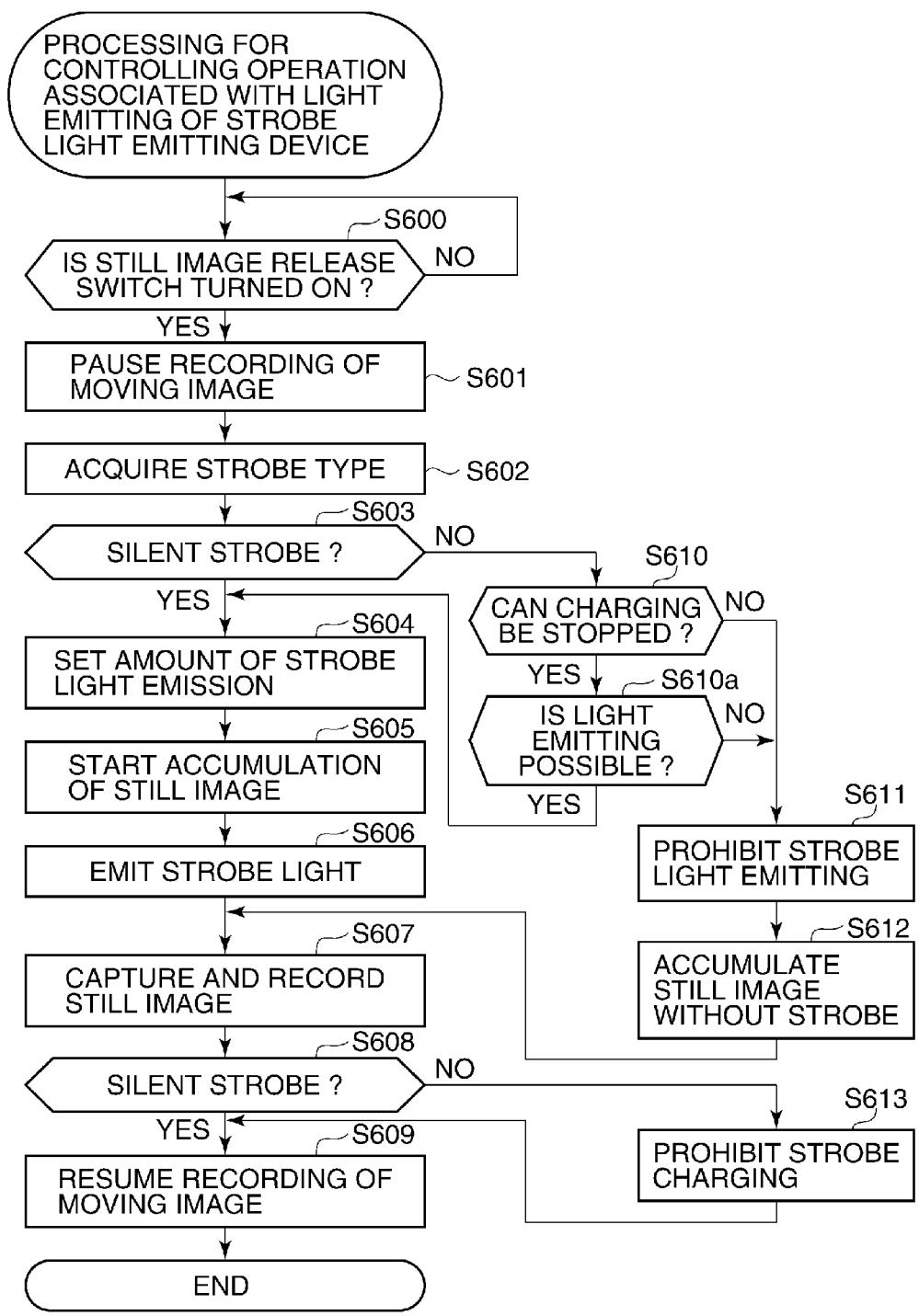
FIG. 4 is a flowchart showing a procedure of control processing implemented by a CMCU of the image pickup apparatus to control an operation associated with light emitting of the strobe light emitting device according to the present embodiment.

It should be noted that the CMCU 2 incorporates a memory which stores a program and the like for performing communication control shown in the timing chart of FIG. 2 and control of strobe light emitting shown in the flowchart of FIG. 4. In addition, the SMCU 5 incorporates a memory which stores a program and the like for performing the communication control shown in the timing chart of FIG. 2.

In addition, the accessory shoe 3 and the strobe leg 6 are each provided with an X contact, a serial clock contact, and a serial data contact, and when the strobe light emitting device 4 is mounted on the image pickup apparatus 1, contacts corresponding to each other are mutually connected.

Thereby, the CMCU 2 of the image pickup apparatus 1 and the SMCU 5 of the strobe light emitting device 4 can communicate with each other via a serial clock line connected between the serial clock contacts and a serial data line connected between the serial data contacts.

FIG. 2 is a timing chart showing signals communicated between the image pickup apparatus 1 and the strobe light emitting device 4.

When a still image shooting button (not shown) provided on the image pickup apparatus 1 is pressed during recording of a moving image, the CMCU 2 of the image pickup apparatus 1 transmits a clock signal through a serial clock line (not shown) provided in the image pickup apparatus 1 in order to communicate with the SMCU 5 of the strobe light emitting device 4. In this case, the CMCU 2 transmits clock signals continuously through the serial clock line, as well as transmitting a predetermined command signal through the serial data line upon putting the serial data line in an input state. By this means, the CMCU 2 receives serial data sent from the SMCU 5.

In synchronization with the above described clock signals, the SMCU 5 of the strobe light emitting device 4 captures the command signal from the serial data line, and performs some processing corresponding to the command signal and further outputs predetermined data through the serial data line.

FIG. 3 is a diagram showing commands used in communication between the image pickup apparatus 1 and the strobe light emitting device 4.

In FIG. 3, command data 0x0 is a strobe type query command by which the CMCU 2 of the image pickup apparatus 1 inquires of the strobe light emitting device 4 mounted on the image pickup apparatus 1 about a type or a function of the strobe light emitting device 4. In response to this query command, the SMCU 5 of the strobe light emitting device 4 sends data indicating the type or function of the strobe light emitting device 4 to the CMCU 2.

Command data 0x1 is a light emission amount setting command. The CMCU 2 sends data indicating an amount of light emission to be set after sending the light emission amount setting command to the SMCU 5. Upon receiving the light emission amount setting command and the data, the SMCU 5 sets the amount of strobe light emission based on the light emission amount setting command and the data, and sends to the CMCU 2 data indicating the amount of light emission which has been actually set.

Command data 0x2 is a zoom position setting command. The CMCU 2 sends data indicating a zoom position to be set after sending the zoom position setting command to the SMCU 5. Upon receiving the zoom position setting command and the data, the SMCU 5 sets the zoom position based on the zoom position setting command and the data, and sends to the CMCU 2 data indicating the zoom position which has been actually set.

Command data 0x3 is a charge control command. The CMCU 2 sends data indicating a charging mode such as a start of charging (0x01) or a stop of charging (0x02) after sending the charge control command to the SMCU 5. Upon receiving the charge control command and the data for a charging mode, the SMCU 5 performs control of charging based on the charge control command and the charging mode, and sends to the CMCU 2 data indicating a state of a charging circuit (not shown) for a main capacitor.

Command data 0x4 is a charge state query command which is sent from the CMCU 2 to the SMCU 5. Upon receiving the charge state query command, the SMCU 5 senses a state of charge such as a charging rate or a charging voltage of the main capacitor (not shown) for strobe light emitting which is charged by the charging circuit, and sends data indicating the state of charge to the CMCU 2.

FIG. 4 is a flowchart showing a procedure of control processing implemented by the CMCU 2 of the image pickup apparatus 1 to control an operation associated with light emitting of the strobe light emitting device 4 according to the present embodiment. As used herein, the operation associated with light emitting refers to a light emitting operation and an operation for charging the main capacitor for strobe light emitting.

In FIG. 4, when the still image shooting button is pressed so that a still image release switch is turned on during moving image recording (YES in step S600), the CMCU 2 of the image pickup apparatus 1 proceeds to step S601.

The CMCU 2 pauses a moving image recording operation in order to change settings of the image pickup apparatus 1 so as to be suitable for shooting of a still image (step S601). At this point, to keep temporal continuity of a recorded moving image file, the CMCU 2 records a predetermined. still image into the moving image file during a time until the still image shooting is completed.

The CMCU 2 sends the above described strobe type query command to the SMCU 5 of the strobe light emitting device 4 mounted on the image pickup apparatus 1, thereby acquiring information of the type or function of the strobe light emitting device 4 (step S602).

Then, based on the information acquired from the strobe light emitting device 4 in step S602, the CMCU 2 determines whether or not the strobe light emitting device 4 is a silent strobe light emitting device in which the oscillation frequency of a charging circuit during charging is outside an audible frequency band (step S603). Then, if the strobe light emitting device 4 is determined to be the silent strobe light emitting device (YES in step S603), the CMCU 2 determines the amount of strobe light emission. Then, the CMCU 2 sends a light emission amount setting command and data based on the determined light emission amount to the SMCU 5 so as to set the amount of strobe light emission (step S604). Then, the CMCU 2 starts an operation of accumulating a still image (step S605), causes the strobe light emitting device 4 to emit strobe light at predetermined timing (step S606), and captures the still image and records it on a recording medium (step S607).

If the strobe light emitting device 4 is determined not to be the silent strobe light emitting device (NO in step S603), the CMCU 2 determines whether or not the strobe light emitting device 4 is a strobe light emitting device having a control function for stopping charging (hereinafter referred to as a charge stop control function) based on the information acquired in step S602 (step S610).

If the strobe light emitting device 4 is determined to be the strobe light emitting device having the charge stop control function (YES in step S610), the CMCU 2 sends the charge state query command to the SMCU 5, and determines an amount of strobe light emission and sends a light emission amount setting command and data based on the determined light emission amount to the SMCU 5 as well. Then, when a charge state of the main capacitor of the strobe light emitting device 4 and an actually set amount of strobe light emission are sent from the SMCU 5, the CMCU 2 determines whether or not light emission is possible based on the charge state and the actually set amount of strobe light emission (step S610a). If light emission is determined to be possible, the CMCU 2 executes steps S604 to S607 as in the case of the silent strobe light emitting device. On the other hand, if light emission is determined not to be possible, the CMCU 2 proceeds to step S611. In other words, if the strobe light emitting device 4 is the strobe light emitting device having the charge stop control function, the CMCU 2 permits the SMCU 5 to perform strobe light emitting unless charging is required for the strobe light emitting.

On the other hand, if the strobe light emitting device 4 is a strobe light emitting device without the charge stop control function (NO in step S610), the CMCU 2 prohibits strobe light emitting of the strobe light emitting device 4 (step S611). Then, the CMCU 2 accumulates the still image without using strobe light (step S612). After a lapse of a predetermined accumulation time, the CMCU 2 proceeds to step S607 to capture the still image and record it on the recording medium.

After capturing and recording the still image, the CMCU 2 again determines whether or not the strobe light emitting device 4 is the silent strobe light emitting device (step S608). Alternatively, without the above repeated determination, the determination result in step S603 may be stored so that the stored determination result can be referenced in step S608 to execute the following processing. If the strobe light emitting device 4 is not the silent strobe light emitting device (NO in step S608), the CMCU 2 issues to the strobe light emitting device 4 a command to prohibit charging of the internal main capacitor (step S613). After that, the CMCU 2 resumes the moving image recording (step S609). On the other hand, if the strobe light emitting device 4 is the silent strobe light emitting device (YES in step S608), the CMCU 2 proceeds to step S609 to resume the moving image recording. In this case, the main capacitor is charged after the moving image recording is resumed. If the strobe light emitting device 4 is not the silent strobe light emitting device, the main capacitor is not charged during the moving image recording, but is charged after the moving image recording is completed.

As described above, in the present embodiment, if the mounted strobe light emitting device 4 is the silent strobe light emitting device, the CMCU 2 permits strobe light emission for still image shooting during moving image recording being paused. If the mounted strobe light emitting device 4 has the charge stop control function, the CMCU 2 permits strobe light emission unless charging is required for the strobe light emission for still image shooting during moving image recording being paused.

Further, if the strobe light emitting device 4 is not the silent strobe light emitting device and has no charge stop control function, the CMCU 2 prohibits strobe light emission for still image shooting during moving image recording being paused even if the internal main capacitor has been fully charged.

As described above, in the present embodiment, the CMCU 2 suitably controls an operation associated with light emitting of the strobe light emitting device 4 involved with still image shooting during moving image recording being paused, according to a type or a function of the mounted strobe light emitting device 4, so that a charging sound during charging of the main capacitor is prevented from being recorded. Thus, the operation associated with light emitting is suitably controlled according to the type or function of the mounted strobe light emitting device 4 in a case where still image shooting is only performed during moving image recording being paused, but it is not necessary to control the operation associated with light emitting according to the type or function of the mounted strobe light emitting device 4 in a case where a still image shooting is performed in a state of not recording a moving image.

Further, in a case where the strobe light emitting device 4 is arranged and used in a position remote from the image pickup apparatus 1, that is, the strobe light emitting device 4 is used as a so-called slave strobe, the operation associated with light emitting may not be controlled in the above described manner because a charging sound is less likely to be recorded even while the image pickup apparatus 1 is recording a moving image.

It should be noted that the present invention is not limited to the above described embodiment, and various modifications may be made. For example, a mode may be set by a button operation or the like which allows a user to cause strobe light emitting at the user's will to shoot a still image during moving image recording being paused even if the mounted strobe light emitting device 4 is not the silent strobe light emitting device.

In addition, when a still image is shot during moving image recording being paused, if the main capacitor internally included in the strobe light emitting device 4 has been fully charged and strobe light emitting has been prohibited, this fact may be displayed on a display unit of the image pickup apparatus 1. Further, in a case where strobe light emitting is permitted for still image shooting unless charging is required for the strobe light emitting after resuming moving image recording being paused, it is desirable that this fact is also displayed on the display unit of the image pickup apparatus 1 because whether the strobe light emitting is permitted or prohibited depends on a determined amount of light emission.

Furthermore, in the above two cases, when the fact that strobe light emitting is prohibited is displayed, it may be displayed in different forms corresponding to the respective cases so that a user can easily identify why the strobe light emitting has been prohibited.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-138236, filed Jun. 9, 2009, which is hereby incorporated by reference herein in its entirety.

What is claimed is:

1. An image pickup apparatus detachably connecting to a light emitting device and is configured to perform still image shooting during moving image recording being paused according to a still image shooting instruction received during the moving image recording being performed and resume the moving image recording after performing the still image shooting, the image pickup apparatus comprising:
    an acquiring unit adapted to acquire information about charge control of the connected light emitting device; and
    a light emission control unit adapted to determine whether or not an oscillation frequency at a time when the connected light emitting device performs charging of a main capacitor is within an audible frequency band based on the information about the charge control acquired by said acquiring unit and whether or not to permit light emitting of the connected light emitting device involved with the still image shooting based on the determination result.

2. The image pickup apparatus according to claim 1, wherein if said light emission control unit determines that the oscillation frequency is not within the audible frequency band, said light emission control unit permits the light emitting of the connected light emitting device involved with the still image shooting.

3. The image pickup apparatus according to claim 1, wherein if said light emission control unit determines that the oscillation frequency is within the audible frequency band, said light emission control unit prohibits the light emitting of the connected light emitting device involved with the still image shooting.

4. The image pickup apparatus according to claim 3, further comprising:
    a display unit adapted to display information which indicates that the light emitting of the connected light emitting device involved with the still image shooting is prohibited.

5. The image pickup apparatus according to claim 3, wherein said light emission control unit determines whether or not the image pickup apparatus can control the connected light emitting device not to perform charging of the main capacitor based on the information about the charge control acquired by said acquiring unit, and if said light emission control unit determines that the connected light emitting device can be controlled not to perform the charging, said light emission control unit permits the light emitting of the connected light emitting device involved with the still image shooting even if the oscillation frequency is determined to be within the audible frequency band.

6. The image pickup apparatus according to claim 5, wherein even if it is determined that the connected light emitting device can be controlled not to perform the charging, said light emission control unit prohibits the light emitting of the connected light emitting device involved with the still image shooting if the charging of the main capacitor is required for the light emitting involved with the still image shooting.

7. The image pickup apparatus according to claim 6, further comprising:
    a display unit adapted to display information which indicates that the light emitting of the connected light emitting device involved with the still image shooting is prohibited.

8. The image pickup apparatus according to claim 7, wherein said display unit displays the information in a form which differs between a case where the light emitting of the connected light emitting device involved with the still image shooting is prohibited because the oscillation frequency is within the audible frequency band and the connected light emitting device cannot be controlled not to perform the charging and a case where the light emitting of the connected light emitting device involved with the still image shooting is prohibited because the charging of the main capacitor is required for the light emitting involved with the still image shooting.

9. The image pickup apparatus according to claim 5, further comprising:
    a charge control unit adapted to prohibit the connected light emitting device from performing charging, based on the information about the charge control acquired by said acquiring unit,
    wherein if said charge control unit determines that the connected light emitting device can be controlled not to perform the charging, said charge control unit prohibits the connected light emitting device from performing the charging during the moving image recording.

10. An image pickup apparatus detachably connecting to a light emitting device and is configured to perform still image shooting during moving image recording being paused according to a still image shooting instruction received during the moving image recording being performed and resume the moving image recording after performing the still image shooting, the image pickup apparatus comprising:
    an acquiring unit adapted to acquire information about a type of the connected light emitting device; and
    a light emission control unit adapted to determine whether or not the connected light emitting device is a light emitting device in which an oscillation frequency at a time when the light emitting device charges a main capacitor is within an audible frequency band based on the information about the type acquired by said acquiring unit and whether or not to permit light emitting of the connected light emitting device involved with the still image shooting based on the determination result.

11. The image pickup apparatus according to claim 10, wherein if the connected light emitting device is a light emitting device in which an oscillation frequency at a time when the light emitting device charges a main capacitor is not within an audible frequency band, said light emission control unit permits the light emitting of the connected light emitting device involved with the still image shooting.

12. The image pickup apparatus according to claim 10, wherein if the connected light emitting device is a light emitting device in which an oscillation frequency at a time when the light emitting device charges a main capacitor is within an audible frequency band, said light emission control unit prohibits the light emitting of the connected light emitting device involved with the still image shooting.

13. The image pickup apparatus according to claim 12, further comprising:
a display unit adapted to display information which indicates that the light emitting of the connected light emitting device involved with the still image shooting is prohibited.

14. The image pickup apparatus according to claim 12, wherein if the connected light emitting device is a light emitting device which can be controlled not to perform charging of the main capacitor by the image pickup apparatus, said light emission control unit permits the light emitting of the connected light emitting device involved with the still image shooting even if the connected light emitting device is the light emitting device in which the oscillation frequency is within the audible frequency band.

15. The image pickup apparatus according to claim 14, wherein even if the connected light emitting device is the light emitting device which can be controlled not to perform the charging, said light emission control unit prohibits the light emitting of the connected light emitting device involved with the still image shooting if the charging of the main capacitor is required for the light emitting involved with the still image shooting.

16. The image pickup apparatus according to claim 15, further comprising:
a display unit adapted to display information which indicates that the light emitting of the connected light emitting device involved with the still image shooting is prohibited.

17. The image pickup apparatus according to claim 16, wherein said display unit displays the information in a form which differs between a case where the light emitting of the connected light emitting device involved with the still image shooting is prohibited because the oscillation frequency is within the audible frequency band and the connected light emitting device cannot be controlled not to perform the charging and a case where the light emitting of the connected light emitting device involved with the still image shooting is prohibited because the charging of the main capacitor is required for the light emitting involved with the still image shooting.

18. The image pickup apparatus according to claim 14, further comprising:
a charge control unit adapted to prohibit the connected light emitting device from performing charging, based on the information about the type acquired by said acquiring unit,
wherein if the connected light emitting device is the light emitting device which can be controlled not to perform the charging, said charge control unit prohibits the connected light emitting device from performing the charging during the moving image recording.

19. An image pickup apparatus detachably connecting to a light emitting device and has a sound recording function, the image pickup apparatus comprising:
an acquiring unit adapted to acquire information about charge control of the connected light emitting device; and
a charge control unit adapted to determine whether or not an oscillation frequency at a time when the connected light emitting device performs charging of a main capacitor is within an audible frequency band based on the information about the charge control acquired by said acquiring unit and whether or not to permit the connected light emitting device from performing charging during sound recording based on the determination result.

20. The image pickup apparatus according to claim 19, wherein if said charge control unit determines that the oscillation frequency is not within the audible frequency band, said charge control unit permits the connected light emitting device to perform the charging during the sound recording, and if said charge control unit determines that the oscillation frequency is within the audible frequency band, said charge control unit prohibits the connected light emitting device from performing the charging during the sound recording.

21. An image pickup apparatus detachably connecting to a light emitting device and has a sound recording function, the image pickup apparatus comprising:
an acquiring unit adapted to acquire information about a type of the connected light emitting device; and
a charge control unit adapted to determine whether or not the connected light emitting device is a light emitting device in which an oscillation frequency at a time when the light emitting device charges a main capacitor is within an audible frequency band based on the information about the type acquired by said acquiring unit and whether or not to permit the connected light emitting device from performing charging during sound recording based on the determination result.

22. The image pickup apparatus according to claim 21, wherein, if the connected light emitting device is a light emitting device in which an oscillation frequency at a time when the light emitting device charges a main capacitor is not within an audible frequency band, said charge control unit permits the connected light emitting device to perform the charging during the sound recording, and if the connected light emitting device is a light emitting device in which the oscillation frequency is within the audible frequency band, said charge control unit prohibits the connected light emitting device from performing the charging during the sound recording.

23. A control method of an image pickup apparatus detachably connecting to a light emitting device and is configured to perform still image shooting during moving image recording being paused according to a still image shooting instruction received during the moving image recording being performed and resume the moving image recording after performing the still image shooting, the control method comprising:
an acquiring step of acquiring information about charge control of the connected light emitting device; and
a light emission controlling step of determining whether or not an oscillation frequency at a time when the connected light emitting device performs charging of a main capacitor is within an audible frequency band based on the information about the charge control acquired by said acquiring step and whether or not to permit light emitting of the connected light emitting device involved with the still image shooting based on the determination result.

24. A control method of an image pickup apparatus detachably connecting to a light emitting device and is configured to perform still image shooting during moving image recording being paused according to a still image shooting instruction received during the moving image recording being performed and resume the moving image recording after performing the still image shooting, the control method comprising:

an acquiring step of acquiring information about a type of the connected light emitting device; and a light emitting controlling step of determining whether or not the connected light emitting device is a light emitting device in which an oscillation frequency at a time when the light emitting device charges a main capacitor is within an audible frequency band based on the information about the type acquired by said acquiring step and whether or not to permit light emitting of the connected light emitting device involved with the still image shooting based on the determination result.

25. A control method of an image pickup apparatus detachably connecting to a light emitting device and has a sound recording function, the control method comprising:

an acquiring step of acquiring information about charge control of the connected light emitting device; and a charge controlling step of determining whether or not an oscillation frequency at a time when the connected light emitting device performs charging of a main capacitor is within an audible frequency band based on the information about the charge control acquired by said acquiring step and whether or not to permit the connected light emitting device from performing charging during sound recording based on the determination result.

26. A control method of an image pickup apparatus detachably connecting to a light emitting device and has a sound recording function, the control method comprising:

an acquiring step of acquiring information about a type of the connected light emitting device; and a charge controlling step of determining whether or not the connected light emitting device is a light emitting device in which an oscillation frequency at a time when the light emitting device charges a main capacitor is within an audible frequency band based on the information about the type acquired by said acquiring step and whether or not to permit the connected light emitting device from performing charging during sound recording based on the determination result.

* * * * *